3,476,639
GLASS REINFORCED NON-VULCANIZED FLASHING MATERIALS BASED ON VINYLIDENE CHLORIDE-ACRYLONITRILE COPOLYMERS

William H. Wineland, Midland, Mich., assignor to The Dow Chemical Company, Midland, Mich., a corporation of Delaware
No Drawing. Filed Dec. 17, 1964, Ser. No. 419,202
Int. Cl. B32b 5/28, 17/10
U.S. Cl. 161—151          1 Claim

ABSTRACT OF THE DISCLOSURE

This invention is directed to a protective sheeting for use as flashing in various construction assemblies. More particularly it pertains to a composite structure formed from (1) a thermoplastic sheet comprising a homogeneous mixtures of a normally crystalline vinylidene chloride-acrylonitrile copolymer, modifying amounts of a rubber-like copolymer of a conjugated diolefin and acrylonitrile, a non-volatile plasticizer and a soft reinforcing carbon and (2) a non-woven reinforcing glass mat having a thickness of less than 0.01 of an inch in essentially coextensive lamination with at least one major surface of the thermoplastic sheet. This structure provides unexpectedly good flexibility and dimensional stability when exposed for extended periods of time to unduly varying climatic conditions.

---

It is standard construction practice to use flashing in exposed angles between roof and gutter, or in valleys between intersecting roof surfaces, over fascia boards, at joints between masonry or metal and wood, (as where chimneys or vent pipes intersect a roof and where masonry parapet walls abut a wooden roof) and between wooden and masonry members of still structures at floors or windows, as well as in many other places where similar problems exist. The nature of the flashing employed generally varies according to the type and intended permanence of the structure. The more durable flashings heretofore employed have been sheet copper, aluminum or sheet lead. Less permanent flashings can be made of galvanized iron or of a tar-impregnated "roofing paper." Recently, in quality installations, sheet materials containing polymers of vinylidene chloride have been used for this purpose.

Each of the conventional prior known flashings has some serious recognized shortcomings. Thus, the sheet metal flashings are difficult to seal tightly, especially at joints involving wooden structural supports, and nails driven through such flashing to hold it in place establish potential leaks. These, of course, tend to become progressively worse as electrolysis occurs at the point of contact between the nail and the flashing.

There are atmospheric conditions, especially in factory districts or in coal-burning communities, which exert an accelerated corrosive effect on metal flashings. Joints in metal flashing must be made by welding (as in the case of lead) or soldering. Such operations are slow and expensive, and, in addition, require considerable skill for proper results.

Flashings made of roofing paper are weak. As they age, they tend to develop leaks around nail holes. They also, particularly on aging, become brittle in cold weather and, in addition, are combustible.

Furthermore, none of the prior metal or tar-impregnated paper flashings have been resilient enough to be safely walked on without permanent or damaging deformation.

In attempting to overcome some of the defects of prior flashing materials, some use has been made of rubber sheeting. While this has been relatively easier to apply, it also has pronounced and disadvantageous drawbacks. Thus, it is generally uneconomical to use and, in addition, often is not long-lived, due to oxidation and resulting brittleness in the course of a very few years.

As has been indicated, resilient, synthetic, thermoplastic sheeting containing polymers of vinylidene chloride have been used as flashing with considerable success, although such material suffers from a tendency to lose flexibility and other desirable properties with age, particularly when exposed to low temperatures for relatively long periods. Further, such prior known sheeting suffers from dimensional instability resulting from excessive shrinkage when exposed to elevated temperatures, as encountered during exposure to the sun, for extended periods of time.

Accordingly, it is an object of this invention to provide a new, long-lived, dimensionally stable, resilient, self-extinguishing, non-vulcanized, thermoplastic flashing material which is especially adapted to retain its shape, flexibility and strength properties under a wide variation of climatic conditions over extended periods of time.

Yet another object of the present invention is to provide an improved flashing material which does not deteriorate or spoilate the properties of wooden members to which it is bonded, sealed, or otherwise attached.

Still another object of the present invention is to provide an improved, non-vulcanizable, thermoplastic flashing material of corrosion resistant character for use in construction.

A still further object of the invention is to provide an improved thermoplastic flashing material which is easily sealed to other sheets of like material and which forms a tight seal around nails and other fastening devices that are driven through it.

An additional object of this invention is to provide an improved thermoplastic flashing material which is not damaged or permanently deformed when subjected to temporary localized stress and/or elevated temperatures.

Other and related objects and advantages will become evident from the following specification and claim.

The flashing material of the present invention is a composite structure formed from;

(1) A thermoplastic sheet comprising a homogeneous admixture of (a) a normally crystalline polymer of from about 80 to about 88 weight percent vinylidene chloride and from about 12 to about 20 weight percent acrylonitrile, (b) between about 0.2 and 0.5 part by weight of a non-volatile plasticizer per part of the normally crystalline polymer, (c) from about 0.3 to 0.6 part of a soft reinforcing carbon per part of normally crystalline polymer, and (d) from about 25 feet to about 4 weight percent of the composition of a rubber-like copolymer of from about 70 to about 85 percent by weight of at least one open-chain aliphatic conjugated diolefin having from 4 to about 9 carbon atoms and from 15 to 30 percent by weight of acrylonitrile; and (2) A non-woven reinforcing glass mat having a thickness of less than about 0.01 of an inch applied in essentially co-extensive lamination with at least one major surface of said thermoplastic sheet.

The flashing material of the present invention is in a non-cured or unvulcanized state when incorporated in the structure of which it forms a part and remains substantially unvulcanized.

The composite structures of the invention are notably improved against prolonged atmospheric deterioration which may tend to undesirably degrade other resilient, cured, thermoplastic, flashing materials and are especially resistant to dimensional instability upon exposure to applied stress and/or elevated temperatures. Still further, such structures are capable of retaining their resiliency and strength properties when exposed for extended periods of time to low temperature, e.g., temperatures of 0° F. or lower.

Surprisingly, it is only when the normally crystalline vinylidene chloride-acrylonitrile copolymer is constituted in the specified proportions of interpolymerized comonomers that the highly useful products of the present invention are obtained. Greater proportions of vinylidene chloride result in copolymers which cannot be compounded to a useful, unvulcanized state capable of yielding resilient sheets on fabrication thereof. The same is true of such copolymers prepared with more than the stated proportions of interpolymerized acrylonitrile.

Further, it has been found that the presence of from about 4 to about 25 weight percent, based on the weight of the herein defined normally crystalline vinylidene chloride-acrylonitrile copolymers, of a rubber-like copolymer of (1) about 70 to 85 weight percent of an open-chain aliphatic conjugated diolefin having from 4 to about 9 carbon atoms, such as butadiene, chloroprene, isoprene, 2-methyl butadiene-1,3, 2-ethyl butadiene-1,3, 2,3-dimethyl butadiene-1,3, 2,3-diethyl butadiene-1,3 and the like, with (2) from about 30 to about 15 weight percent of acrylonitrile; is necessary for obtainment of structures having required flexibility and impact resistance at low temperatures. The contemplated rubbery copolymers, in addition to providing greatly improved low temperature flexibility and impact strength, are uniquely distinguished from other rubbery thermoplastic copolymeric materials by being desirably compatible when used in the required quantities, with the remaining constituents of the thermoplastic sheet component of the claimed composite structure. The contemplated rubbery copolymers are further characterized by having a Mooney viscosity at about 212° F. of from about 11 to about 150, and preferably in the range of from about 30 to about 70. Such copolymers are known and may be prepared by copolymerizing the monomers in aqueous emulsion, as for example, by the procedure as generally disclosed in the U.S. Patent No. 2,462,354.

The thermoplastic sheet useful for preparing flashing stock, according to the present invention, further requires the presence of plasticizers in the stated range of proportions if the product is to have the required workability in the raw or non-cured, thermoplastic state. Required toughness and resilience needed during the handling and installation of the flashing material is also ensured by the presence of plasticizers in the specified proportions.

The plasticizers useful in practice of the present invention are selected from certain of those known to be effective in vinyl resin plasticization. However, the plasticizers that are most suitable for utilization are not recognizable from ordinary practices and established criteria in the vinyl polymer art. For example, dioctyl sebacate, dioctyl adipate, and many other common plasticizers for standard vinyl polymers do not flux readily with the copolymer mixture that is utilized in practice of the present invention. Thus, they are not particularly desired for use in the present compositions.

Nonetheless, the sole plasticizers (or primary plasticizers in plastifying combination thereof) that are satisfactory for practice of the present invention may be selected from a wide variety of plasticizing materials. Besides flexibility, another essential requirement for the plasticizer is that it be substantially non-volatile.

Representative of suitable primary plasticizers for use in the present flashing compositions are dicarbitol phthalate; ethoxy diglycol phthalate; n-butyl benzyl phthalate; and dibutyl phthalate. Still other plasticizers adapted for use in the present invention are, on the basis of requirements, therefore, apparent. Selection may be made in specific instances following routine and straight-forward preliminary testing on the above-indicated basis.

The presence of an amount of soft filler or reinforcing compound in the stated range serves the purpose of strengthening the thermoplastic sheets used in the present invention. The reinforcing compound is usually carbon black of the kind widely used in the rubber art and known therein as a "soft reinforcing carbon." Such a material has a specific gravity of about 1.30, a particle size wherein about 99.9 percent passes through a 200 mesh screen (U.S. Standard Sieve Series); and a moisture and ash content at 100–105° C. of about 0.5 weight percent, maximum.

Additionally, known pigments and fillers may be incorporated in the thermoplastic sheets in varying amounts if desired. Such pigments and fillers may be employed to impart various colors to the flashing material in order to have it harmonize or contrast with the color of the placement surface. The thermoplastic sheet may also include antioxidants, light stabilizers, and other additives known in the art which do not deleteriously affect the properties of the flashings formed from such sheet.

The thermoplastic sheet constituent of the novel composite structures can be prepared in various ways. One convenient manner is to mix together the required copolymer, carbon black, and any other dry powdered ingredients (if any be used). Then, after suitably warming the mixed ingredients at a temperature well below the fusion or softening temperature of the mixture, the plasticizer or combination of plasticizers is added. After this, the mixing of the formulation is continued until a uniform, homogeneous mass is obtained. It may be advantageous, at this state, to add small amounts of stearic acid or other known roll-release agents. The resulting mixture is thoroughly blended in a ribbon blender or similar device with the required amounts of rubbery copolymer and thereafter extruded into a continuous sheet. For use as flashing, the sheets are preferably made in thicknesses of from about 0.03 to about 0.12 inch. A convenient and generally useful thickness, as has been indicated, is between about 0.04 and 0.06 inch. Of course, thinner or thicker sheet material may be made and employed in various applications, as may be desired or required in particular instances. Even in sheets thicker than about 0.12 inch, however, the flashing material of the present invention retains its many inherent beneficial attributes and properties.

It has further been found that lamination of a non-woven glass reinforcing mat to at least one major surface of the preformed thermoplastic sheet is required to provide optimum dimensional stability when such sheet is used as flashing stock or as a continuous roof membrane material and the like. The utilization of such reinforcement is particularly advantageous for preventing shrinking and/or undesirable distortion of the thermoplastic sheet when subjected to localized stress and/or to elevated temperatures for extended periods of time.

A non-woven glass mat reinforcement having a thickness of less than about 0.01 of an inch and preferably having a thickness of about 0.005 of an inch is preferred to provide a composite structure having optimum dimensional stability while maintaining adequate flexibility and impact strength. Such reinforcement may be coated with various conventionally employed binders for the individual strands, such as the polyesters, acrylics, melamines and phenolic resins and the like.

By way of comparison, it has been found that non-woven glass mats having a thickness of greater than about 0.01 of an inch, or woven mesh type glass reinforcing structures, wherein the thermoplastic sheet of the present invention becomes relatively deeply embedded in the glass mesh, significantly reduce the impact strength and low temperature flexibility of the composite structure of the present invention.

The glass mat reinforcement is applied to one or both major surfaces of the thermoplastic sheet by any conventional technique utilizing pressure adequate to form a composite laminated structure. It is generally advantageous, however, to apply such reinforcement by passing the glass mat and the thermoplastic sheet in overlying relationship between the nip of two or more laminating rolls heated to a temperature of between about 185 to about 200° F. while utilizing a pressure sufficient to provide adequate lamination, without destroying the construction of the glass reinforcing material.

In order that those skilled in the art may better understand how the composite structures in accordance with the present invention may be prepared, the following example is given by way of illustration and not by way of limitation. All parts and percentages in the example are by weight.

Example

Into a ribbon blender was charged about 40.7 weight percent of a copolymer of about 82 percent interpolymerized vinylidene chloride and about 18 percent interpolymerized acrylonitrile; about 22.5 weight percent of powdered, medium, thermal ("Thermax") reinforcing carbon having an average particle size of about 450 millimicrons in which at least 99.9 percent passed a 200 mesh screen (U.S. Standard Sieve Series); about 12.2 weight percent of dicarbitol phthalate plasticizer; about 0.4 weight percent of the diglycidyl ether of bisphenol A; about 6.3 weight percent of n-butyl benzyl phthalate; and about 17 weight percent of a comminuted rubbery copolymer of 80 percent butadiene-1,3 and 20 percent acrylonitrile, said copolymer having a Mooney viscosity at 212° F. of about 20. The charged ingredients were then thoroughly blended together to form an essentially homogeneous mixture.

The mixture was then extruded into several individual sheets having a thickness of from about 0.04 to 0.06 of an inch.

One of such sheets was then reinforced with a 0.005 inch thick non-woven glass mat available commercially as "FAMCO–1A507," by applying such mat in essentially co-extensive lamination with a major surface of such sheet by passage of the same through the nip of conventional laminating rolls operating at a pressure and a temperature sufficient to laminate the glass reinforcement with the thermoplastic sheet. The composite structure was designated as Sheet No. 1.

For purposes of comparison, a composite structure was identically prepared utilizing a similar glass mat reinforcement having a thickness of about 0.01 of an inch. This structure was designated as Sheet No. 2.

In yet another comparison, a thermoplastic sheet was prepared as described herein to which no reinforcement was applied. This structure was designated Sheet No. 3.

In still another comparison, a composite structure was prepared as described herein using a 10 x 10 woven glass mesh reinforcement available commercially as "Barley-Earhart 101 RH." This structure was designated Sheet No. 4.

In yet another comparison, a thermoplastic sheet was prepared as described herein from which the glass reinforcement and the rubbery copolymers of butadiene and acrylonitrile had been excluded. This non-reinforced structure was designated Sheet No. 5.

The following table summarizes the results of physical properties determined on the above-described sheet materials. The column headings of such table have the following meanings:

Impact strength—Number of ft./lbs. at 0° F. to produce fracture by dropping a ⅞ inch diameter metal sphere on the surface of the article.
Percent shrinkage—Percent shrinkage in machine direction of sheet resulting by immersion of such sheet in boiling water.
Flexibility—Number of flexures at −18° C. before evidence of cracking or breaking.

TABLE I

| | Sheet Composition | | Physical Properties | | |
|---|---|---|---|---|---|
| Sheet No. Designation | Butadiene-Acrylonitrile Copolymer, Percent by Weight | Glass Reinforcement | Impact, ft./lbs. at 0° F. | Percent Shrinkage, 5 Min. in Boiling Water | Flexibility −18° C., Number of Flexes ×10³ |
| This Invention: 1 | 17 | 0.005 inch thick non-woven glass mat | 8.4 | 0.13 | 28 |
| For Comparison: | | | | | |
| 2 | 17 | 0.01 inch thick non-woven glass mat | 4.56 | | |
| 3 | 17 | None | 28 | 10.14 | 28 |
| 4 | 17 | 10 x 10 woven glass mat | >1-2 | 4.4 | 2.3 |
| 5 | None | None | >1 | 2.7 | 28 |

It is apparent from the data presented in Table I above that utilization of the rubbery butadiene-acrylonitrile copolymers and the non-woven glass mat reinforcement having a thickness of less than about 0.01 of an inch provides significantly improved resistance to shrinkage, without reduction in low temperature flexibility and with minimum reduction in impact strength of the defined composite structure. Such data further illustrates the unexpectedly beneficial results obtained using a non-woven glass mat having a thickness of less than about 0.01 inch as a reinforcing material.

Similar comparative results are obtained utilizing from 4 to 25 weight percent of the rubbery butadiene-acrylonitrile copolymer. Impact strengths are progressively lessened, however, as the amounts of the rubbery copolymer employed are reduced. Further, amounts of such rubbery copolymer in excess of about 25 weight percent, based on the weight of vinylidene chloride-acrylonitrile copolymer, result in blends which are extremely soft and limp and difficult if not impossible to extrude into sheets or otherwise fabricate by conventional techniques.

Similar good results are obtained utilizing any of the composite structures which are described herein as constituting the present invention.

What is claimed is:

1. A flexible, dimensionally stable, delamination resistant, two component laminate consisting essentially of: a film layer and a reinforcing layer wherein said film layer consists of a non-vulcanized, resilient, thermoplastic sheet comprising a homogeneous mixture of (a) a normally crystalidene chloride and about 18 weight percent interpolymerized acrylonitrile, (b) from about 0.2 and 0.5 part by weight per part of said normally crystalline copolymer of a non-volatile plasticizer for said copolymer, (c) from about 0.3 to about 0.6 part by weight of a soft reinforcing carbon per part of said normally crystalline copolymer, and (d) from about 4 to 25 weight percent, based on the total weight of the mixture, of a rubber-like copolymer of about 80 weight percent butadiene-1,3 and about 20 weight percent acrylonitrile, wherein substantially all the particles in said soft reinforcing carbon pass a 200 mesh screen of the U.S. Standard Sieve Series; and wherein said reinforcing layer consists of a nonwoven reinforcing glass mat having a thickness of less than about 0.01 of an inch.

References Cited

UNITED STATES PATENTS

| 2,456,454 | 12/1948 | Signer. | |
| 2,802,764 | 8/1957 | Slayter et al. | 181—33 |
| 3,219,617 | 11/1965 | Mack et al. | 260—890 |

MORRIS SUSSMAN, Primary Examiner

U.S. Cl. X.R.

161—204

PO-1050
(5/69)

UNITED STATES PATENT OFFICE
CERTIFICATE OF CORRECTION

Patent No. 3,476,639     Dated November 4, 1969

Inventor(s) William H Wineland

It is certified that error appears in the above-identified patent and that said Letters Patent are hereby corrected as shown below:

In Column 6, line 50 change "crystalidene" to read --crystalline-- and following crystalline, insert --copolymer of from about 82 weight percent vinylidene--.

SIGNED AND
SEALED
MAY 12 1970

(SEAL)
Attest:

Edward M. Fletcher, Jr.
Attesting Officer

WILLIAM E. SCHUYLER,
Commissioner of Paten